(12) United States Patent
Amundsen

(10) Patent No.: US 7,319,330 B2
(45) Date of Patent: Jan. 15, 2008

(54) SYSTEM AND METHOD FOR ELECTROMAGNETIC WAVEFIELD RESOLUTION

(75) Inventor: Lasse Amundsen, Trondheim (NO)

(73) Assignee: Electromagnetic Geoservices AS, Trondheim (NO)

( * ) Notice: Subject to any disclaimer, the term of this patent is extended or adjusted under 35 U.S.C. 154(b) by 14 days.

(21) Appl. No.: 10/515,519

(22) PCT Filed: May 21, 2003

(86) PCT No.: PCT/GB03/02164

§ 371 (c)(1),
(2), (4) Date: Jul. 6, 2005

(87) PCT Pub. No.: WO03/100467

PCT Pub. Date: Dec. 4, 2003

(65) Prior Publication Data

US 2006/0103387 A1    May 18, 2006

(30) Foreign Application Priority Data

May 24, 2002    (GB) ................... 0212052.5

(51) Int. Cl.
*G01V 3/08* (2006.01)
*G01V 3/12* (2006.01)
(52) U.S. Cl. .................... 324/337; 324/334
(58) Field of Classification Search ............ 324/337, 324/334
See application file for complete search history.

(56) References Cited

U.S. PATENT DOCUMENTS

| | | |
|---|---|---|
| 2,077,707 A | 4/1937 | Melton |
| 2,531,088 A | 11/1950 | Thompson |
| 3,052,836 A | 9/1962 | Postma |
| 3,398,356 A | 8/1968 | Still |
| 3,548,299 A | 12/1970 | Duroux et al. |
| 3,806,795 A | 4/1974 | Morey |
| 3,836,960 A | 9/1974 | Gehman et al. |
| 3,959,721 A | 5/1976 | Roschuk et al. |
| 4,010,413 A | 3/1977 | Daniel |
| 4,047,098 A | 9/1977 | Duroux |
| 4,079,309 A | 3/1978 | Seeley |
| 4,168,484 A | 9/1979 | Wright, Jr. |
| 4,258,321 A | 3/1981 | Neale, Jr. |
| 4,258,322 A | 3/1981 | Rocroi et al. |
| 4,296,379 A | 10/1981 | Yoshizumi |
| 4,308,499 A | 12/1981 | Thierbach et al. |
| 4,417,210 A | 11/1983 | Rocroi et al. |
| 4,446,434 A | 5/1984 | Sternberg et al. |
| 4,451,789 A | 5/1984 | Meador |
| 4,489,276 A | 12/1984 | Yu |
| 4,492,924 A | 1/1985 | Nilsson |
| 4,506,225 A | 3/1985 | Loveless et al. |
| 4,547,733 A | 10/1985 | Thoraval |
| 4,583,095 A | 4/1986 | Peterson |
| 4,594,551 A | 6/1986 | Cox et al. |
| 4,616,184 A | 10/1986 | Lee et al. |
| 4,617,518 A | 10/1986 | Srnka |
| 4,633,182 A | 12/1986 | Dzwinel |
| 4,652,829 A | 3/1987 | Safinya |
| 4,677,438 A | 6/1987 | Michiguchi et al. |
| 4,760,340 A | 7/1988 | Denzau et al. |
| 4,791,998 A | 12/1988 | Hempkins et al. |
| 4,835,473 A | 5/1989 | Bostick, Jr. |
| 4,835,474 A | 5/1989 | Parra et al. |
| 4,957,172 A | 9/1990 | Patton et al. |
| 4,992,995 A | 2/1991 | Favret |
| 5,025,218 A | 6/1991 | Ramstedt |
| 5,043,667 A | 8/1991 | Schofield |
| 5,066,916 A | 11/1991 | Rau |
| 5,103,920 A | 4/1992 | Patton |
| 5,177,445 A | 1/1993 | Cross |
| 5,185,578 A | 2/1993 | Stolarczykz |
| 5,192,952 A | 3/1993 | Johler |
| 5,280,284 A | 1/1994 | Johler |
| 5,373,443 A | 12/1994 | Lee et al. |
| 5,400,030 A | 3/1995 | Duren et al. |
| 5,444,619 A | 8/1995 | Hoskins et al. |
| H1490 H | 9/1995 | Thompson et al. |
| 5,486,764 A | 1/1996 | Thompson et al. |
| H1524 H | 4/1996 | Thompson et al. |
| H1561 H | 7/1996 | Thompson |

(Continued)

FOREIGN PATENT DOCUMENTS

EP    0 087 271 A2    8/1983

(Continued)

OTHER PUBLICATIONS

Ursin, "Review of elastic and electromagnetic wave propagation in horizontally layered media," Geophysics, vol. 48, No. 8, pp. 1063-1081, Aug. 1983.

Osen et al., "Removal of water-layer multiples from multicomponent sea-bottom data," Geophysics, vol. 64, No. 3, pp. 838-851, May-Jun. 1999.

Kaufman et al., "Electromagnetic Field Of An Electric Dipole On The Surface Of A Medium Containing A Thin Resistant Layer," pp. 285-313, date not available.

(Continued)

*Primary Examiner*—Jay M Patidar
(74) *Attorney, Agent, or Firm*—Patterson, Thuente, Skaar & Christensen, P.A.

(57) ABSTRACT

A method of processing an electromagnetic wavefield response in a seabed logging operation. The wavefield is resolved into upgoing and downgoing components. The downgoing component represents reflections from the sea surface while the upgoing component represents reflections and refractions from subterranean strata. The upgoing component is then subjected to analysis.

16 Claims, No Drawings

U.S. PATENT DOCUMENTS

| | | | |
|---|---|---|---|
| 5,563,513 | A | 10/1996 | Tasci et al. |
| 5,581,024 | A | 12/1996 | Meyer, Jr. et al. |
| 5,689,068 | A | 11/1997 | Locatelli et al. |
| 5,704,142 | A | 1/1998 | Stump |
| 5,724,309 | A | 3/1998 | Higgs et al. |
| 5,767,679 | A | 6/1998 | Schröder |
| 5,777,478 | A | 7/1998 | Jackson |
| 5,811,973 | A | 9/1998 | Meyer, Jr. |
| 5,825,188 | A | 10/1998 | Montgomery et al. |
| 5,841,280 | A | 11/1998 | Yu et al. |
| 5,877,995 | A | 3/1999 | Thompson et al. |
| 5,886,526 | A | 3/1999 | Wu |
| 5,892,361 | A | 4/1999 | Meyer, Jr. et al. |
| 5,901,795 | A | 5/1999 | Tsao et al. |
| 5,940,777 | A | 8/1999 | Keskes |
| 5,955,884 | A | 9/1999 | Payton et al. |
| 5,987,388 | A | 11/1999 | Crawford et al. |
| 6,002,357 | A | 12/1999 | Redfern et al. |
| 6,011,557 | A | 1/2000 | Keskes et al. |
| 6,023,168 | A | 2/2000 | Minerbo |
| 6,026,913 | A | 2/2000 | Mandal et al. |
| 6,049,760 | A | 4/2000 | Scott |
| 6,060,884 | A | 5/2000 | Meyer, Jr. et al. |
| 6,060,885 | A | 5/2000 | Tabarovsky et al. |
| 6,087,833 | A | 7/2000 | Jackson |
| 6,101,448 | A | 8/2000 | Ikelle et al. |
| 6,114,972 | A | 9/2000 | Smith |
| 6,157,195 | A | 12/2000 | Vail, III |
| 6,163,155 | A | 12/2000 | Bittar |
| 6,181,138 | B1 | 1/2001 | Hagiwara et al. |
| 6,184,685 | B1 | 2/2001 | Paulk et al. |
| 6,188,221 | B1 | 2/2001 | Van de Kop et al. |
| 6,188,222 | B1 | 2/2001 | Seydoux et al. |
| 6,225,806 | B1 | 5/2001 | Millar et al. |
| 6,246,240 | B1 | 6/2001 | Vail, III |
| 6,294,917 | B1 | 9/2001 | Nichols |
| 6,339,333 | B1 | 1/2002 | Kuo |
| 6,389,360 | B1 | 5/2002 | Alft et al. |
| 6,480,000 | B1 | 11/2002 | Kong et al. |
| 6,628,119 | B1 | 9/2003 | Eidesmo et al. |
| 6,859,038 | B2 | 2/2005 | Ellingsrud et al. |
| 6,864,684 | B2 | 3/2005 | Ellingsrud et al. |
| 6,900,639 | B2 | 5/2005 | Ellingsrud et al. |
| 7,123,543 | B2 * | 10/2006 | Vaage et al. .................. 367/24 |
| 2003/0048105 | A1 | 3/2003 | Ellingsrud et al. |
| 2003/0052685 | A1 | 3/2003 | Ellingsrud et al. |
| 2004/0027130 | A1 | 2/2004 | Ellingsrud et al. |

FOREIGN PATENT DOCUMENTS

| | | |
|---|---|---|
| EP | 0 219 234 A2 | 4/1987 |
| EP | 0 512 756 A1 | 11/1992 |
| EP | 0 814 349 A2 | 12/1997 |
| FR | 2 479 992 | 10/1981 |
| GB | 2 155 182 A | 9/1985 |
| GB | 2 256 715 A | 12/1992 |
| GB | 2 296 567 A | 7/1996 |
| GB | 2 301 902 A | 12/1996 |
| WO | WO 81/01617 | 6/1981 |
| WO | WO 90/00749 | 1/1990 |
| WO | WO 92/15900 | 9/1992 |
| WO | WO 94/20864 | 9/1994 |
| WO | WO 94/20864 A1 | 9/1994 |
| WO | WO 96/06367 | 2/1996 |
| WO | WO 96/33426 | 10/1996 |
| WO | WO 97/33184 | 9/1997 |
| WO | WO 98/28638 | 7/1998 |
| WO | WO 99/13966 | 3/1999 |
| WO | WO 00/00850 | 1/2000 |
| WO | WO 00/13037 | 3/2000 |
| WO | WO 00/13046 | 3/2000 |
| WO | WO 00/13046 A1 | 3/2000 |
| WO | WO 00/54075 | 9/2000 |
| WO | WO 00/63718 | 10/2000 |
| WO | WO 01/55749 | 8/2001 |
| WO | WO 01/57555 A1 | 8/2001 |
| WO | WO 02/14906 | 2/2002 |
| WO | WO 03/034096 | 4/2003 |
| WO | WO 03/048812 | 6/2003 |

OTHER PUBLICATIONS

Young et al., "Electromagnetic Active Source Sounding Near the East Pacific Rise," Geophysical Research Letters, vol. 8, No. 10, pp. 1043-1046, Oct. 1981.

Kaufman et al., "Marine Electromagnetic Prospecting System," 1981 Annual Meeting Abstracts, 1 page.

Garg et al., "Synthetic electric sounding surveys over known oil fields," Geophysics, vol. 49, No. 11, pp. 1959-1967, Nov. 1984.

Cheesman et al., "On the theory of sea-floor conductivity mapping using transient electromagnetic systems," Geophysics, vol. 52, No. 2, pp. 204-217, Feb. 1987.

Chave et al., "Some comments on seabed propagation of ULF/ELF electromagnetic fields," Radio Science, vol. 25, No. 5, pp. 825-836, Sep./Oct. 1990.

Greaves et al., "New Dimensions in Geophysics for Reservoir Monitoring," SPE Formation Evaluation, pp. 141-150, Jun. 1991.

Edwards, "On the resource evaluation of marine gas hydrate deposits using sea-floor transient electric dipole-dipole methods," Geophysics, vol. 62, No. 1, pp. 63-74, Jan.-Feb. 1997.

Sinha et al., "Evidence for accumulated melt beneath the slow-spreading Mid-Atlantic Ridge," Phil. Trans. R. Soc. Lond. A, No. 355, pp. 233-253, 1997.

Sinha et al., "Magmatic processes at slow spreading ridges: implications of the RAMESSES experiment at 57° 45'N on the Mid-Atlantic Ridge," Geophys. J. Int., No. 135, pp. 731-745, 1998.

Macgregor et al., The RAMESSES experiment-III. Controlled-source electromagnetic sounding of the Reykjanes Ridge at 57° 45'N, Geophys. J. Int., No. 135, pp. 773-789, 1998.

Macgreggor, "Marine controlled source electromagnetic sounding: Development of a regularized inversion for 2-dimensional resistivity structures," LITHOS Science Report, No. 1, pp. 103-109, Apr. 1999.

Macgregor et al., "Use of marine controlled-source electromagnetic sounding for sub-basalt exploration," Geophysical Prospecting, No. 48, pp. 1091-1106, 2000.

Yuan et al., "The assessment of marine gas hydrates through electrical remote sounding: Hydrate without a BSR ?," Geophysical Research Letters, vol. 27, No. 16, pp. 2397-2400, Aug. 15, 2000.

Eidesmo et al., "How electromagnetic sounding technique could be coming to hydrocarbon E&P," First Break, vol. 20, No. 3, pp. 142-152, Mar. 2002.

Eidesmo et al., "Remote detection of hydrocarbon filled layers using marine controlled source electromagnetic sounding," EAGE 64th Conference & Exhibition—Florence, Italy, 4 pages, May 27-30, 2002.

Ellingsrud et al., "Remote sensing of hydrocarbon layers by seabed logging (SBL): Results from a cruise offshore Angola," The Leading Edge, pp. 972-982, Oct. 2002.

Greeg et al., "Remote mapping of hydrocarbon extent using marine Active Source EM Sounding," EAGE 65th Conference & Exhibition—Stavanger, Norway, 4 pages, Jun. 2-5, 2003.

Macgregor, "Joint analysis of marine active and passive source EM data for sub-salt or sub-basalt imaging," EAGE 65th Conference & Exhibition—Stavanger, Norway, 4 pages, Jun. 2-5, 2003.

* cited by examiner

SYSTEM AND METHOD FOR ELECTROMAGNETIC WAVEFIELD RESOLUTION

RELATED APPLICATION

This application claims priority to PCT Application No. PCT/GB03/02164 filed May 21, 2003, and Great Britain Application No. 0212052.5 filed May 24, 2002.

TECHNICAL FIELD

The present invention is concerned with electromagnetic data acquisition and processing. In particular, the invention relates to a system and method for electromagnetic wavefield resolution.

BACKGROUND OF THE INVENTION

Marine electromagnetic exploration is an important tool for locating off-shore hydrocarbon reserves and monitoring hydrocarbon production for reservoir management. One known procedure for marine electromagnetic involves the use of an electromagnetic source and receiver cables as described in the present applicants' WO 01/57555. Electromagnetic energy generated by the source propagates both upwards into the water column and downwards through the earth. The downward propagating waves are partially reflected and refracted by subsurface layers. The reflected and refracted energy travels upwardly from the subsurface layers and is detected by the receiver array. In particular, hydrocarbon filled reservoirs are known to give strongly refracted energy which is of interest for hydrocarbon imaging.

Electromagnetic exploration however is complicated by waves received at the receiver array as downward-travelling reflections and refractions after reflecting and refracting off the air/water boundary at the surface. The air/water boundary is an efficient reflector and refractor, and thus the waves travelling downwards are difficult to differentiate from the upgoing waves from the subsurface. The downward-travelling energy is caused both by energy propagating directly from the electromagnetic source to the air/water boundary and by energy from the subsurface travelling to the air/water boundary.

Reflections and refractions from the sea surface thus are a severe problem. If the sea surface reflections and refractions are not properly attenuated, they may interfere and overlap with primary reflections and refractions from the subsurface.

It is an object of the present invention to provide a method of processing an EM wavefield which minimises this difficulty.

SUMMARY OF THE INVENTION

According to the invention a method of processing an electromagnetic (EM) wavefield comprises resolving (or decomposing) the wavefield into upgoing and downgoing compounds and then analysing the upgoing component. Optimal processing, analysis and interpretation of electromagnetic data ideally require full information about the wavefield so that the wavefield can be resolved into its upgoing and downgoing constituents.

At a position just above or below the seabed the sea surface reflections and refractions are always downgoing wavemodes. The reflections and refractions of interest from the subsurface, however, are upgoing wavemodes. Resolution (or decomposition) of the electromagnetic wavefield into upgoing and downgoing constituents just above or below the seabed puts the sea surface reflections and refractions into the downgoing component whereas the subsurface reflections and refractions are contained in the upgoing component.

The present invention provides a technique that resolves (or decomposes) the electromagnetic wavefield recorded along one or several receiver arrays into upgoing and downgoing wave components.

Preferably, therefore the wavefield is resolved using the Maxwell Equations:

$$\Delta \times E(x,t) = \mu(z) \delta_t H(x,t) \quad (1)$$

$$\Delta \times H(x,t) = [\sigma(z) + \epsilon(z) \delta_t] E(x,t) \quad (2)$$

for electric and magnetic fields respectively in an isotropic medium, where: $x=(x_1, x_2, x_3)$ denotes a fixed co-ordinate system with a depth axis positively downwards and $x_3=z$; $\mu$ is magnetic permeability, $\epsilon$ is magnetic permittivity and $\sigma$ is electrical conductivity, whereby $\mu=\mu(z)$, $\epsilon=\epsilon(z)$ and $\sigma=\sigma(z)$; E is the electric field, and H is the magnetic field.

The technique can be used on electromagnetic data recorded on an areal grid or on data recorded along a profile (line) or on data recorded as single receiver stations. Each recorded component of the electromagnetic wavefield should be properly calibrated before the resolution technique is applied. The calibration ensures that the components of the electromagnetic field satisfy as closely as possible Maxwell's Equations. Preferably, Maxwell's Equations (1) and (2) are transformed using a Fourrier transform function with respect to time and horizontal spatial co-ordinates.

The present invention provides an approximate technique that lends itself to adoption in the case of recorded electromagnetic data from individual receiver stations, (that is, no summation or integration over receiver stations is required).

Preferably, the upgoing component of the EM wavefield is derived using the following formulae:

$$U^{(E1)} = 1/2(E_1 - 1/CE \; H_2) \quad (50)$$

$$U^{(E2)} = 1/2(E_1 - 1/CE \; H_2) \quad (50)$$

where $U^{(E1)}$ is the upgoing compound of $E_1$ and $E_1$ is the electric field in a first horizontal direction; $U^{(E2)}$ is the upgoing component of $E_2$ and $E_2$ is the electric field in a second horizontal direction; $H_1$ and $H_2$ are the magnetic fields in the first and second directions; C is the speed of wave propagation; and E is the complex permittivity.

Thus, by using Maxwell's Equations, a new method is provided for resolving a marine electromagnetic wavefield into upgoing and downgoing wave constituents. The effects of the air/water surface can be removed or attenuated through the up/down resolution step. The analysis results in expressions where slowness (or wavenumber) dependent filters are multiplied with the electromagnetic data Fourier transformed to a slowness (or wavenumber) domain. After wavefield resolution, the filtered data are inverse-Fourier transformed to a space domain for possible further processing analysis or interpretation. For vertically traveling plane waves the resolution filters are independent of slowness: the filters become simple scalers. Wavefield resolution then can be carried out directly in a space domain. In this case, the up- and downgoing separation is performed for each receiver station in the electromagnetic experiment. Furthermore, these scalers can be used to resolve approximately the electromagnetic wavefield into upgoing and downgoing components even for the non-vertically traveling electromagnetic wavefield.

For up- and downgoing separation just above the seabed, the resolution filters depend on the material parameters of water. For up- and downgoing separation just below the sea floor the resolution filters require knowledge of or an estimate of the complex wave speed and the complex permittivity (or resistivity, the reciprocal of permittivity) of the sea floor material.

The invention also extends to a method of determining the nature of strata beneath the seabed which comprises: applying an electromagnetic (EM) wavefield to the strata; detecting an EM wavefield response; and processing the wavefield as described above; the nature of the strata being derived from the analysis of the upgoing component of the detected wavefield response.

Preferably, the EM field is applied by means of a transmitter located at or near the seabed, and the wavefield response is detected by means of a receiver located at or near the seabed. Preferably the EM wavefield is transmitted at a frequency between 0.01 and 20 Hz.

Preferably the transmitter and receiver are dipole antennae, though other forms of transmitters and receivers can be used. Preferably, the EM wavefield is applied for a time in the range 3 seconds to 60 minutes.

The magnetic measurement necessary may be taken using known magnetotelluric instruments. Alternatively, integrated measuring instruments can be used which record both magnetic and electric fields.

While the description in this specification mentions the sea and sea bed, it is to be understood that these terms are intended to include inland marine systems such as lakes, river deltas etc.

The invention may be carried into practice in various ways and one approach to the resolution of the wavefield will now be described in detail, by way of example, in order to illustrate the derivation of formulae the upgoing wavefield component.

DETAILED DESCRIPTION

First Maxwell's Equations will be reviewed. Then it will be shown how the electromagnetic wavefield can be resolved (or decomposed) into upgoing and downgoing waves.

A list of the most frequently used symbols is given in Appendix A.

Maxwell's Equations

We first show how Maxwell's equations can be transformed to the frequency-horizontal wavenumber domain. Let $x=(x_1\ x_2\ x_3)$ denote a fixed coordinate system with the depth axis positive downwards. For notational convenience, we will also use $x_3=z$. On the sea floor, assume that the material parameters magnetic permeability $\mu$ and permittivity $\epsilon$ as well as the electrical conductivity $\sigma$ do not vary laterally so that $$\mu=\mu(z);\ \epsilon=\epsilon(z);\ \sigma=\sigma(z)$$

Maxwell's equations for the electric and magnetic fields, in conjunction with the constitutive relations, for an isotropic medium are given as $$\nabla \times E(x,t) = -\mu(z)\partial_t H(x,t) \quad (1)$$

$$\nabla \times H(x,t) = [\sigma(z)+\epsilon(z)\partial_t]E(x,t) \quad (2)$$

where E is electric field, and H is the magnetic field. Introduce the Fourier transform with respect to time and horizontal spatial coordinates $$G(k_1, k_2, \omega) = \int_{-\infty}^{\infty}\int_{-\infty}^{\infty}\int_{-\infty}^{\infty} dx\,dy\,dt \exp[-i(k_1 x_1 + k_2 x_2 - \omega t)]g(x_1, x_2, t) \quad (3)$$

with inverse $$g(x_1, x_2, t) = \frac{1}{(2\pi)^3}\int_{-\infty}^{\infty}\int_{-\infty}^{\infty}\int_{-\infty}^{\infty} dk_1\,dk_2\,d\omega \exp[i(k_1 x_1 + k_2 x_2 - \omega t)]G(k_1, k_2, \omega) \quad (4)$$

The Fourier transform of equations (1) and (2) gives $$\partial_3 E_1 = -i\omega\left[-\frac{p_1 p_2}{\epsilon}H_1 + \left(\mu - \frac{p_1^2}{\epsilon}\right)(-H_2)\right] \quad (5)$$

$$\partial_3 E_2 = -i\omega\left[\left(\mu - \frac{p_2^2}{\epsilon}\right)H_1 - \frac{p_1 p_2}{\epsilon}(-H_2)\right] \quad (6)$$

$$-\partial_3 H_2 = -i\omega\left[\left(\epsilon - \frac{p_2^2}{\mu}\right)E_1 + \frac{p_1 p_2}{\mu}E_2\right] \quad (7)$$

$$\partial_3 H_1 = -i\omega\left[\frac{p_1 p_2}{\mu}E_1 + \left(\epsilon - \frac{p_1^2}{\mu}\right)E_2\right] \quad (8)$$

Where $E_1=E_1(k_1, k_2, z, w)$ is the transformed electric field, etc. In equations (5) to (8) we have introduced the complex permittivity $$\epsilon = \varepsilon\left(1 + \frac{i\sigma}{\omega\varepsilon}\right) \text{ and} \quad (9)$$

$$p_i = k_i/\omega;\ i = 1, 2 \quad (10)$$

Matrix Vector Differential Equation

Equations (5) to (8) can be written as an ordinary matrix-vector differential equation $$\partial_3 b = -i\omega A b, \quad (11)$$

where the wave vector b is a 4×1 column vector $$b = \begin{bmatrix} E_1 \\ E_2 \\ -H_2 \\ H_1 \end{bmatrix} \quad (12)$$

and the system matrix A is a 4×4 matrix partitioned into four 2×2 submatrices of which the diagonal ones are zero, $$A = \begin{bmatrix} 0 & A_1 \\ A_2 & 0 \end{bmatrix} \quad (13)$$

The submatrices $A_1$ and $A_2$ are symmetric $$A_1 = \begin{bmatrix} \mu - \frac{p_1^2}{\epsilon} & -\frac{p_1 p_2}{\epsilon} \\ -\frac{p_1 p_2}{\epsilon} & \mu - \frac{p_2^2}{\epsilon} \end{bmatrix}; A_2 = \begin{bmatrix} \epsilon - \frac{p_2^2}{\mu} & \frac{p_1 p_2}{\mu} \\ \frac{p_1 p_2}{\mu} & \epsilon - \frac{p_1^2}{\mu} \end{bmatrix} \quad (14)$$

$A_1$ and $A_2$ are functions of the parameters in Maxwell's equations (and therefore, functions of z) and of $p_i$.

Decomposition into Up- and Downgoing Waves

For the decomposition of the electromagnetic field into up- and downgoing waves it is necessary to find the eigenvalues and eigenvectors of the system matrix A for given wavenumbers and frequencies. The wave vector b can be decomposed into up- and downgoing waves $$w = [U^T, D^T]^T, \quad (15)$$

where $U^T = [U_1, U_2]$ and $D^T = [D_1, D_2]$, by the linear transformation $$b = Lw, \quad (16)$$

where L is the local eigenvector matrix of A (i.e., each column of L is an eigenvector).

Since L is the eigevector matrix of A it follows that $$A = L\Lambda L^{-1},$$

where $\Lambda$ is the diagonal matrix of the corresponding eigenvalues of A:

$$\Lambda = \text{diag}[-\lambda_1, -\lambda_2, \lambda_1, \lambda_2] \quad (17)$$

Eigenvalues of A

The eigenvalues of A are $$\lambda_1 = \lambda_2 \equiv q = (c^{-2} - p^2)^{1/2} \quad (18)$$

where $$c^{-2} = \epsilon\mu \quad (19)$$

$$p^2 = p_1^2 + p_2^2 \quad (20)$$

Eigenvector Matrix of A

The eigenvector matric of A can be given as $$L = \begin{bmatrix} \frac{p_1 p_2}{\epsilon q} & \frac{q_1^2}{\epsilon q} & -\frac{p_1 p_2}{\epsilon q} & -\frac{q_1^2}{\epsilon q} \\ -\frac{q_2^2}{\epsilon q} & -\frac{p_1 p_2}{\epsilon q} & \frac{q_2^2}{\epsilon q} & \frac{p_1 p_2}{\epsilon q} \\ 0 & -1 & 0 & -1 \\ 1 & 0 & 1 & 0 \end{bmatrix} \quad (21)$$

with inverse $$L^{-1} = \frac{1}{2}\begin{bmatrix} -\frac{c^2 p_1 p_2 \epsilon}{q} & \frac{c^2 q_1^2 \epsilon}{q} & 0 & 1 \\ -\frac{c^2 q_2^2 \epsilon}{q} & \frac{c^2 p_1 p_2 \epsilon}{q} & -1 & 0 \\ \frac{c^2 p_1 p_2 \epsilon}{q} & -\frac{c^2 q_1^2 \epsilon}{q} & 0 & 1 \\ \frac{c^2 q_2^2 \epsilon}{q} & -\frac{c^2 p_1 p_2 \epsilon}{q} & -1 & 0 \end{bmatrix} \quad (22)$$

Upgoing and Downgoing Waves

From equation (16) upgoing and downgoing waves are given by $$w = L^{-1} b \quad (23)$$

that is $$U_1 = \frac{1}{2}\left[-\frac{c^2 p_1 p_2 \epsilon}{q} E_1 + \frac{c^2 q_1^2 \epsilon}{q} E_2 + H_1\right] \quad (24)$$

$$U_2 = \frac{1}{2}\left[-\frac{c^2 q_2^2 \epsilon}{q} E_1 + \frac{c^2 p_1 p_2 \epsilon}{q} E_2 + H_2\right] \quad (25)$$

$$D_1 = \frac{1}{2}\left[\frac{c^2 p_1 p_2 \epsilon}{q} E_1 - \frac{c^2 q_1^2 \epsilon}{q} E_2 + H_1\right] \quad (26)$$

$$D_2 = \frac{1}{2}\left[\frac{c^2 q_2^2 \epsilon}{q} E_1 - \frac{c^2 p_1 p_2 \epsilon}{q} E_2 + H_2\right] \quad (27)$$

As is shown below, $U_1$, $D_1$, $U_2$, and $D_2$ have been defined such that $$U_1 + D_1 = H_1; \quad U_2 + D_2 = H_2 \quad (28)$$

This implies that $U_1$ and $D_1$ are the upgoing and downgoing constituents of $H_1$, respectively, whereas $U_2$ and $D_2$ are the upgoing and downgoing constituents of $H_2$, respectively. The scaling of upgoing and downgoing waves is however not unique. We will show below that the upgoing and downgoing waves defined in equation (27) can be scaled such their sum yields upgoing and downgoing constituents of the fields $E_1$ and $E_2$. The upgoing constituents of $H_1$, $H_2$, $E_1$ and $E_2$ will not contain the downgoing reflections and refractions caused by the sea surface. After decomposing the measured electromagnetic field into upgoing and downgoing wave fields the sea surface reflections and refractions will belong to the downgoing part of the fields. The upgoing and downgoing wavefields are inverse Fourier transformed to space domain using equation (4).

Upgoing and Downgoing Constituents of $H_1$ and $H_2$

Equation (28) is easily verified by summation of $U_1$ and $D_1$, and $U_2$ and $D_2$ as given in equation (27). Therefore, the wave fields $U_1$ and $D_1$ are interpreted as upgoing and downgoing constituents of the magnetic field component $H_1$, whereas the wave fields $U_2$ and $D_2$ are interpreted as upgoing and downgoing constituents of the magnetic field component $H_2$. We introduce the notation $$U^{(H_1)} = U_1; \quad D^{(H_1)} = D_1 = H_1 - U^{(H_1)} \quad (29)$$

$$U^{(H_2)} = U_2; \quad D^{(H_2)} = D_2 = H_2 - U^{(H_2)} \quad (30)$$

so that $$H_1 = U^{(H_1)} + D^{(H_1)}; \quad H_2 = U^{(H_2)} + D^{(H_2)} \quad (31)$$

In particular, the upgoing constituents (see equations (24) and (25)) are of interest $$U^{(H_1)} = \frac{1}{2}\left[H_1 - \frac{c^2 \epsilon}{q}(p_1 p_2 E_1 - q_1^2 E_2)\right] \quad (32)$$

$$U^{(H_2)} = \frac{1}{2}\left[H_2 + \frac{c^2 \epsilon}{q}(p_1 p_2 E_2 - q_2^2 E_1)\right] \quad (33)$$

Equations (32) and (33) are the most general formulas for electromagnetic wavefield decomposition of the magnetic field components into upgoing waves. The schemes require the receiver stations to be distributed over an areal on the sea bed so that the electromagnetic wavefield can be transformed to the slowness domain. The decomposition schemes (32) and (33) are valid for a 3D inhomogeneous earth.

Special Case: $p_2 = 0$

When the electromagnetic experiment is run along a single profile electromagnetic data are available along a line only. The magnetic field components $H_1$ and $H_2$ then can be properly decomposed into its upgoing and downgoing waves under the 2.5D earth assumption (no variations in the medium parameters of the earth in the cross-profile direction). Without loss of generality, orient the coordinate system so that the electromagnetic wavefield propagates in the $x_1$, $x_3$-plane such that $p_2=0$. Then, $q_2=c^{-1}$, $q=q_1$, inserted into equation (32) gives $$U^{(H_1)} = \frac{1}{2}(H_1 + c^2 q_1 \epsilon E_2) \tag{34}$$

Equation (34) shows that to remove the downgoing reflected and refracted energy from the $H_1$ magnetic field it is necessary to combine the $H_1$ recording with a scaled (filtered) $E_2$ electric field recording. Similarly, the upgoing component of the $H_2$ field is $$U^{(H_2)} = \frac{1}{2}\left(H_2 - \frac{\epsilon}{q_1} E_1\right) \tag{35}$$

Equations (34) and (35) are strictly valid under the 2.5D earth assumption. However, for single profile data over a 3D earth equations (34) and (35) still can be used as approximate methods to attenuate the downgoing energy on the magnetic $H_1$ and $H_2$ components.

Special Case: $p_1 = p_2 = 0$

The special case of vertically traveling electromagnetic plane waves with $p_1 = p_2 = 0$ such that $q_1 = q_2 = q = c^{-1}$ yields by substitution into equations (32) and (33)

$$U^{(H_1)} = \frac{1}{2}(H_1 + c\epsilon E_2) \tag{36}$$

$$U^{(H_2)} = \frac{1}{2}(H_2 - c\epsilon E_1) \tag{37}$$

Even though equations (36) and (37) are strictly valid only for vertically traveling plane waves as a decomposition method for the magnetic components, they can be a useful approximation for wavefield decomposition also for non-vertically traveling plane waves as well as for the full magnetic $H_1$ and $H_2$ fields. Note that since the scaling factor applied to the electric components does not depend on slowness, equations (36) and (37) can be implemented in space domain. In this special case, $H_1$ or $H_2$ magnetic data recorded on each receiver station are processed independently.

Upgoing and Downgoing Constituents of $E_1$ and $E_2$

By properly scaling the upgoing and downgoing waves $U_1$, $U_2$, $D_1$ and $D_2$ we can find the upgoing and downgoing constituents of the fields $E_1$ and $E_2$.

The scaling must be chosen to give $$E_1 = U^{(E_1)} + D^{(E_1)} \tag{38}$$

$$E_2 = U^{(E_2)} + D^{(E_2)} \tag{39}$$

with $$U^{(E_1)} = U_1^{(E_1)} + U_2^{(E_2)} \tag{40}$$

$$D^{(E_1)} = D_1^{(E_1)} + D_2^{(E_1)} \tag{41}$$

$$U^{(E_2)} = U_1^{(E_2)} + U_2^{(E_2)} \tag{42}$$

$$D^{(E_2)} = D_1^{(E_2)} + D_2^{(E_2)} \tag{43}$$

Introducing $$U_1^{(E_1)} = \frac{p_1 p_2}{\epsilon q} U_1; \ U_2^{(E_1)} = -\frac{q_1^2}{\epsilon q} U_2; \ D_1^{(E_1)} = -\frac{p_1 p_2}{\epsilon q} D_1; \ D_2^{(E_1)} = \frac{q_1^2}{\epsilon q} D_2 \tag{44}$$

we find that equation (38) is fulfilled, and that $$U^{(E_1)} = U_1^{(E_1)} + U_2^{(E_1)} = \frac{1}{2}\left[E_1 + \frac{1}{\epsilon q}(p_1 p_2 H_1 - q_1^2 H_2)\right] \tag{45}$$

Introducing $$U_1^{(E_2)} = \frac{q_2^2}{\epsilon q} U_1; \ U_2^{(E_2)} = -\frac{p_1 p_2}{\epsilon q} U_2; \ D_1^{(E_2)} = -\frac{q_2^2}{\epsilon q} D_1; \ D_2^{(E_2)} = \frac{p_1 p_2}{\epsilon q} D_2 \tag{46}$$

we find that equation (39) is fulfilled, and that $$U^{(E_2)} = U_1^{(E_2)} + U_2^{(E_2)} = \frac{1}{2}\left[E_2 - \frac{1}{\epsilon q}(p_1 p_2 H_2 - q_2^2 H_1)\right] \tag{47}$$

Equations (45) and (47) are the most general formulas for electromagnetic wavefield decomposition of the electric field components into upgoing waves. The schemes require the receiver stations to be distributed over an areal on the sea bed so that the electromagnetic wavefield can be transformed to the slowness domain. The decomposition schemes (45) and (47) are valid for a 3D inhomogeneous earth.

Special Case: $p_2 = 0$

When the electromagnetic experiment is run along a single profile electromagnetic data are available along a line only. The electric field components $E_1$ and $E_2$ then can be properly decomposed into its upgoing and downgoing waves under the 2.5D earth assumption (no variations in the medium parameters of the earth in the cross-profile direction). Without loss of generality, orient the coordinate system so that the electromagnetic wavefield propagates in the $x_1$, $x_3$-plane such that $p_2=0$. Then, $q_2=c^{-1}$, $q=q_1$, inserted into equation (45) gives $$U^{(E_1)} = \frac{1}{2}\left(E_1 - \frac{q_1}{\epsilon} H_2\right) \tag{48}$$

Equation (48) shows that to remove the downgoing reflected and refracted energy from the $E_1$ electric field it is necessary to combine the $E_1$ recording with a scaled (filtered) $H_2$ magnetic field. Similarly, the upgoing component of the $E_2$ field is $$U^{(E_2)} = \frac{1}{2}\left(E_2 + \frac{1}{c^2 \epsilon q_1} H_1\right) \quad (49)$$

Equations (48) and (49) are strictly valid under the 2.5D earth assumption. However, for single profile data over a 3D earth equations (48) and (49) still can be used as an approximate method to attenuate the downgoing energy on the electric $E_1$ and $E_2$ components.

Special Case: $p_1 = p_2 = 0$

The special case of vertically traveling electromagnetic plane waves with $p^1 = p^2 = 0$ such that $q^1 = q^2 = q = c^{-1}$ yields by substitution into equations (45) and (47)

$$U^{(E_1)} = \frac{1}{2}\left(E_1 - \frac{1}{c\epsilon} H_2\right) \quad (50)$$

$$U^{(E_2)} = \frac{1}{2}\left(E_2 + \frac{1}{c\epsilon} H_1\right) \quad (51)$$

Even though equations (50) and (51) are strictly valid only for vertically traveling plane waves as a decomposition method for the electric components, it can also be a useful approximate for wavefield decomposition for non-vertically traveling plane waves as well as for the full electric $E_1$ and $E_2$ fields. Note that since the scaling factor applied to the magnetic components does not depend on slowness, equation (50) can be implemented in space domain. In this special case, $E_1$ or $E_2$ electric data recorded on each receiver station are processed independently.

APPENDIX A

| | |
|---|---|
| A: | system matrix |
| b: | wave vector containing electromagnetic fields |
| w: | wave vector containing upgoing and downgoing waves |
| L: | eigenvector matrix of A |
| B: | magnetic flux density |
| H: | magnetic field; $H = (H_1, H_2, H_3)$ |
| D: | electric displacement field |
| E: | electric field; $E = (E_1, E_2, E_3)$ |
| J: | current density |
| $x = (x_1, x_2, x_3)$: | Cartesian coordinate |
| $U^{(E_1)}$: | upgoing component of $E_1$; $E_1 = U^{(E_1)} + D^{(E_1)}$ |
| $D^{(E_1)}$: | downgoing component of $E_1$ |
| $U^{(E_2)}$: | upgoing component of $E_2$; $E_2 = U^{(E_2)} + D^{(E_2)}$ |
| $D^{(E_2)}$: | downgoing component of $E_2$ |
| $U^{(H_1)}$: | upgoing component of $H_1$; $H_1 = U^{(H_1)} + D^{(H_1)}$ |
| $D^{(H_1)}$: | downgoing component of $H_1$ |

APPENDIX A-continued

| | |
|---|---|
| $U^{(H_2)}$: | upgoing component of $H_2$; $H_1 = U^{(H_2)} + D^{(H_2)}$ |
| $D^{(H_2)}$: | downgoing component of $H_2$ |
| c: | Speed of wave propagation; $c = (\mu\epsilon)^{-1/2}$ |
| k: | Wavenumber; $k = \omega/c$ |
| $k_1$: | Horizontal wavenumber conjugate to $x_1$ |
| $k_2$: | Horizontal wavenumber conjugate to $x_2$ |
| $p_1$: | Horizontal slowness $p_1 = k_1/\omega$ |
| $p_2$: | Horizontal slowness $p_2 = k_2/\omega$ |
| p: | $p^2 = p_1^2 + p_2^2$ |
| q: | Vertical slowness: $q = \sqrt{c^{-2} - p_1^2 - p_2^2}$ |
| $q_1$: | $q_1^2 = c^{-2} - p_1^2$ |
| $q_2$: | $q_2^2 = c^{-2} - p_2^2$ |
| z: | $z = x_3$ |
| $\rho_v$: | volume electric charge density |
| $\rho$: | resistivity; the reciprocal of resistivity is conductivity |
| $\epsilon$: | permittivity |
| $\epsilon$: | complex permittivity, $\epsilon = \varepsilon\left(1 + \frac{i\sigma}{\omega\varepsilon}\right)$ |
| $\mu$: | magnetic permeability |
| $\sigma$: | electrical conductivity; the reciprocal of conductivity is resistivity |
| $\mu$: | eigenvector |
| $\omega$: | circular frequency |
| $\partial_t$: | temporal derivative; $\partial_t = \frac{\partial}{\partial t}$ |
| $\partial_1$: | spatial derivative; $\partial_1 = \frac{\partial}{\partial x_1}$ |
| $\partial_2$: | spatial derivative; $\partial_2 = \frac{\partial}{\partial x_2}$ |
| $\partial_3$: | spatial derivative; $\partial_3 = \frac{\partial}{\partial x_3}$ |

The invention claimed is:

1. A method of determining the nature of strata beneath the seabed comprising applying an electromagnetic (EM) wavefield to the strata; detecting an EM wavefield response; and processing the wavefield by resolving the wavefield to produce upgoing and downgoing components then analyzing the upgoing component, thereby deriving the nature of the strata; wherein the wavefield is resolved using the 2.5D assumption that there are no variations in the medium parameters in the cross-profile direction.

2. The method of claim 1, including the step of applying the EM field is applied by means of a transmitter located at or near the seabed.

3. The method of claim 2, wherein the transmitter is a dipole antenna.

4. The method of claim 2, wherein the wavefield response is detected by means of a receiver located at or near the seabed that is moved to a different location while the transmitter is maintained stationary, and a further EM wavefield is applied, detected and processed.

5. The method of claim 1, wherein the EM wavefield is transmitted at a frequency between 0.01 and 20 Hz.

6. The method of claim 1, wherein the EM wavefield is transmitted at a wavelength between 1 S and 50S, where S is the thickness of the overburden above the considered strata.

7. The method of claim 1, wherein the wavefield response is detected by means of a receiver located at or near the seabed.

8. The method of claim 7, wherein the receiver is a dipole antenna.

9. The method of claim 7, wherein the receiver comprises a detector pair consisting of means for detecting the electromagnetic wavefield and means for detecting a magnetic field.

10. The method of claim 9, wherein the detector pair is housed in a single unit.

11. The method of claim 9, wherein data from one of the detector pairs is used to resolve the field detected by the other of the detector pairs.

12. The method of claim 1, wherein the wavefield is detected using a plurality of receivers arranged over an area of the seabed.

13. The method of claim 12, wherein the receivers are arranged in a line.

14. The method of claim 12, wherein data from an array of receivers is used to resolve the wavefield.

15. The method of claim 12, wherein data from each receiver independently is used to resolve the wavefield.

16. The method of claim 1, wherein the resolution and analysis are carried out on the assumption of vertically traveling plane waves.

* * * * *